June 26, 1962 R. B. SCHRECONGOST 3,041,394

AUTOMATIC FREQUENCY CONTROL CIRCUIT

Filed March 14, 1960

INVENTOR.
Ray B. Schrecongost
BY John L. Wiegreffe
ATTY.

United States Patent Office 3,041,394
Patented June 26, 1962

3,041,394

AUTOMATIC FREQUENCY CONTROL CIRCUIT

Ray B. Schrecongost, Park Ridge, Ill., assignor to Admiral Corporation, Chicago, Ill., a corporation of Delaware Filed Mar. 14, 1960, Ser. No. 14,768
6 Claims. (Cl. 178—7.3)

This invention relates to television receiver automatic frequency control circuits for maintaining synchronism between the horizontal scanning rate of the electron beam in the cathode ray picture tube and the frequency of recurrence of the synchronizing pulses in the received composite television signal.

Automatic frequency control circuits, hereinafter referred to as AFC circuits, for television receivers are old per se. The invention involves an improvement in AFC circuits of the "single-ended" type which utilize a pair of diodes having either their anode or cathode terminals connected together. Synchronizing pulses, which have been separated from the composite television signal, are applied to this connection. A sawtooth voltage, derived by integrating voltage pulses from the horizontal output section of the television receiver, is applied to the remaining terminal of one of the diodes and a filter circuit couples the remaining terminal of the other diode to the input of the horizontal oscillator tube. When the system is balanced, the synchronizing pulse appears midway on the retrace portion of the sawtooth voltage and both diodes conduct equally.

It should be noted at this point that the sawtooth voltage developed has slopes corresponding to the trace and retrace portions of the horizontal deflection voltage applied to the cathode ray tube. In this specification this term, retrace, will be applied to the portion of the sawtooth voltage developed by the charging of the integrating network. In the drawing this corresponds to the rise portions of the various individually shown sawtooth waveforms.

The control voltage impressed upon the horizontal oscillator tube is the algebraic sum of the voltages appearing across the individual diodes. When the horizontal output voltage is in phase or synchronism with the synchronizing signal, a zero output voltage should be obtained. For other positions of the synchronizing pulse with respect to the retrace portion of the sawtooth voltage, a positive or a negative output voltage is obtained which is used to adjust the frequency and phase of the horizontal oscillator to achieve synchronism with the received synchronizing pulses.

Ideally, an AFC circuit should be symmetrical in operation, i.e., the diodes should have balanced action, and produce correction voltages which bear a substantially linear relationship to the phase differential between the synchronizing pulses and the center of the retrace portion of the sawtooth voltage. In the presence of sawtooth voltage only, the diodes must have approximately equal duty cycles to insure zero output voltage from the AFC circuit.

Additionally, an AFC circuit which meets the above requirement will have good noise immunity since noise generally comprises many frequencies which appear over the entire sawtooth retrace slope. Hence, the overall effect on each diode will be the same. Finally, such a circuit will produce zero correction voltage when the synchronizing pulse is in phase with the retrace portion of the sawtooth voltage since the synchronizing pulse will affect conduction equally in both diodes.

The AFC circuit must also be sensitive and capable of "locking-in" quickly. To this end, care must be exercised to insure that the circuit doesn't degenerate the synchronizing signal. Also, for obvious commercial reasons, the AFC circuit should be relatively independent of minor variations in diode characteristics. While these conditions are generally met by "double ended" AFC circuits, this has not been true in the case of the more economical "single ended" circuits. The major problem in these latter circuits has been the lack of balanced action on the part of the diodes.

Many schemes have been presented in the prior art for achieving and maintaining balanced diode action in "single ended" AFC circuits. The problem has been intensified with the introduction of semi-conductor diodes, the parameters of which vary more than those of their vacuum tube counterparts.

One method involved unbalancing the bridging or loading resistors individually connected across the diodes in an effort to compensate for the greater effect one diode tended to have over the other. This method will not produce balanced voltages for all conditions. Another expedient used bridged capacitors across the diodes in an effort to introduce more of the sawtooth voltage to the common junction of the diodes. This last method degenerated the synchronizing pulse to a point where the sensitivity of the entire AFC circuit was substantially impaired.

In general, the "double-ended" circuits perform quite satisfactorily. They are called "double-ended" since the sawtooth voltage is fed to the common diode junction and synchronizing pulses of opposite polarity are impressed upon the remaining terminals of the diodes. The term "single-ended" is understood in the art relating to AFC circuits to mean that only one polarity of synchronizing pulse is used, whereas "double-ended" indicates that two polartities of synchronizing pulses are used. It should be obvious that "single-ended" AFC circuits have a marked economical advantage over "double-ended" AFC circuits.

Some prior art "single-ended" AFC circuits introduce a sawtooth voltage of one polarity to one diode and a sawtooth voltage of opposite polarity to the other diode, in combination with a synchronizing pulse at the junction of the diodes. These circuits, like "double-ended" AFC circuits, are not economically attractive. Additionally, many "single-ended" circuits are not symmetrical in operation, that is, different magnitudes of correction voltages are developed for equal phase deviations of the synchronizing pulse with respect to the center of the retrace portion of the sawtooth voltage. This is especially true in the case of those AFC circuits employing semiconductor diodes.

The circuit of the invention not only overcomes the above mentioned difficulties of the prior art circuits by providing a "single-ended" AFC circuit which maintains symmetry and linearity over a wide range of diode characteristics, but accomplishes this at substantially the same cost as present AFC circuits of similar type. Accordingly, it is an object of this invention to provide an improved automatic frequency control circuit.

Another object of this invention is to provide an automatic frequency control circuit in which introduction of a sawtooth voltage at the junction of the diodes is accomplished without deterioration of the synchronizing signal applied thereto.

A feature of this invention is included in circuitry for introducing a sawtooth voltage to the junction of the diodes, which circuitry incorporates a single capacitor for both coupling the synchronizing signals to the junction and for developing the sawtooth voltage by integration.

Other objects and features of this invention will be readily apparent upon a reading of the specification in conjunction with the drawing in which.

Figure 1:
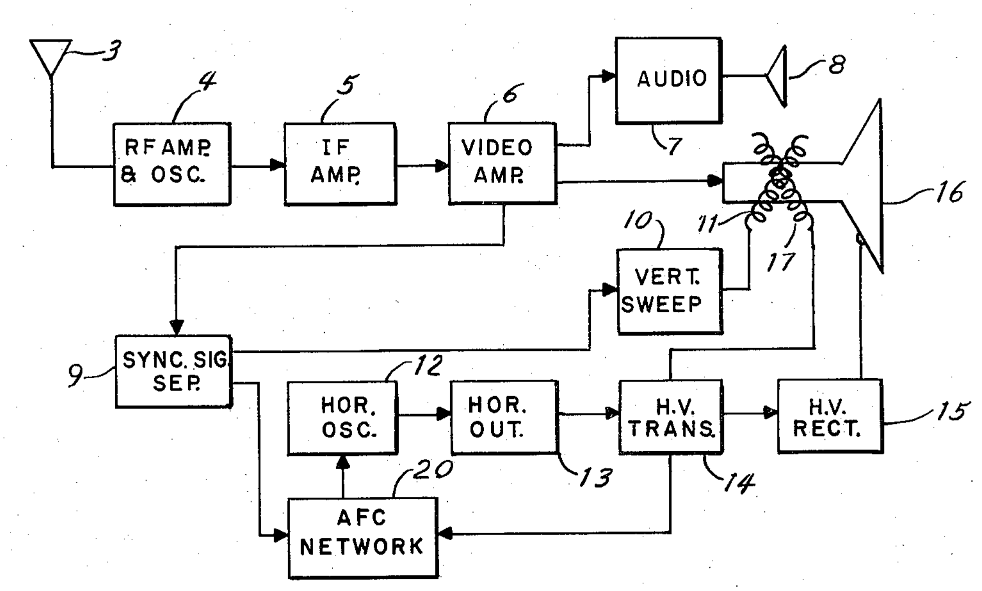
FIG. 1 depicts in block form the various major components of a television receiver and the inter-relationship of these components with the AFC network.

Referring now to FIG. 1, an antenna 3 receives a transmitted composite television signal which is amplified and heterodyned in a well known manner in radio frequency amplifier and oscillator 4. The resultant intermediate frequency signal is amplified in I.-F. amplifier 5 and detected by a video detector (not shown) included in video amplifier 6. The 4.5 megacycle beat frequency, representing the intercarrier sound signal, is taken off and fed to audio section 7 which drives speaker 8 in a well known manner. The video signal is amplified by video amplifier 6 and is impressed on the cathode of cathode ray tube 16. A connection is provided between video amplifier 6 and synchronizing signal separator 9 where, in a manner well known in the art, the synchronizing pulses are removed from the video signal. Vertical synchronizing pulses are fed to vertical sweep circuit 10 which generates a vertical deflection voltage. This vertical voltage is applied to vertical deflection winding 11.

Horizontal oscillator 12 is of the free-running type and generates a horizontal sweep voltage which is impressed upon horizontal output circuit 13. Horizontal output circuit 13 drives high voltage transformer 14 which, in conjunction with horizontal deflection winding 17, develops the horizontal deflection voltage. High voltage rectifier 15 is also fed from the high voltage transformer 14 and develops the high direct current potential necessary for operation of picture tube 16. A separate winding on high voltage transformer 14 is connected to AFC network 20.

Separated synchronizing pulses from synchronizing signal separator 9 are coupled to AFC network 20. AFC network 20 contains circuitry, to be described more fully hereinafter, for comparing the phase and frequency of the separated synchronizing pulses with the phase and frequency of the horizontal oscillator output and for applying a correction voltage to the horizontal oscillator to compensate for deviations therebetween. The circuitry and means for accomplishing this comparison and correction are set out in FIG. 2.

Figure 2:
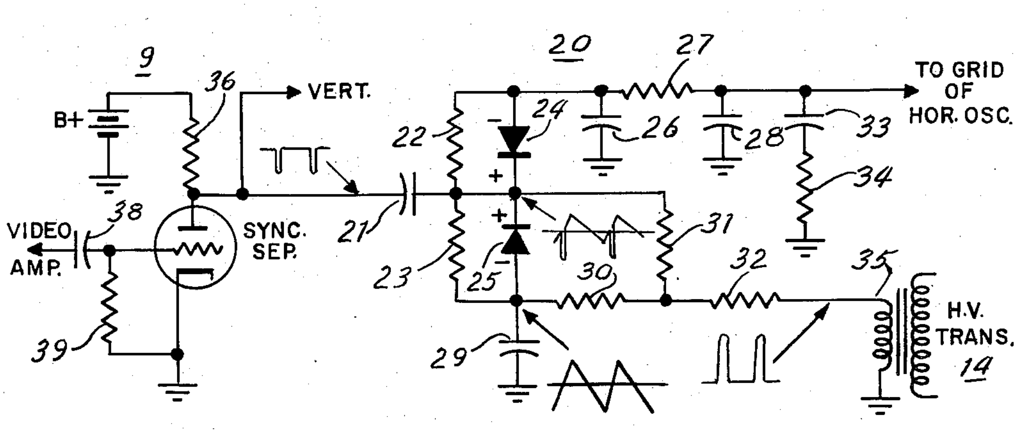
FIG. 2 is a partial schematic diagram showing the invention in the AFC network in detail.

Referring now to FIG. 2, AFC network 20 comprises a pair of diodes 24 and 25 which are joined at their cathode terminals. Resistors 22 and 23 are connected in parallel with diodes 24 and 25, respectively. An integrating network consisting of resistor 32, resistor 30 and capacitor 29 is connected to the anode terminal of diode 25. Similarly, an integrating network consisting of resistor 31, capacitor 21 and the parallel combination of the separator tube plate load resistor 36 and the internal resistance of the synchronizing separator tube is fed from the pulse source at the junction of resistors 30 and 32, and is connected to the common diode junction. The B+ supply for the synchronizing separator tube appears as an A.C. ground. As plate resistor 36 of the synchronizing separator and the internal resistance of the synchronizing separator are small in comparison with resistor 31, these impedances have little effect on the integrating action.

It will be recognized that resistors 30 and 32 introduce impedance to the second mentioned integrating network, but have little effect on its action. Independent networks may readily be used. However, other design considerations dictate that resistor 32 be employed due to presence of the high pulse voltage, which is in time relation with the horizontal sweep voltage. This pulse voltage is illustrated in FIG. 2 as appearing across winding 35 of high voltage transformer 14. It should also be noted that the diode polarities shown will be reversed if positive going synchronizing pulses are employed.

The anode of diode 24 is connected to a filter network comprising capacitor 26, resistor 27 and capacitor 28. The output of this filter feeds the series combination of a capacitor 33 and a resistor 34 which will be recognized as an "anti-hunt" circuit for preventing "over control" of the horizontal oscillator. The output of the filter is indicated as being connected to the grid of the horizontal oscillator. This is illustrative only, since any portion of the horizontal oscillator circuit which will shift the oscillator phase and frequency in response to magnitude and polarity voltage changes may be employed.

The synchronizing separator tube is shown as a triode although it will be appreciated that other types of synchronizing separators may be utilized, including so called "noise-gated" types. In the drawing, the grid of the synchronizing separator tube is R-C coupled to the video amplifier by capacitor 38 and resistor 39. After a few cycles of operation, capacitor 38 charges to the point where only the most positive portions of the signal cause conduction in the synchronizing separator tube. Thus, the separator tube is biased back and conducts only during occurrence of synchronizing pulses, (the most positive portions of the signal). Each time the tube conducts, the voltage at the junction of plate resistor 36 and the plate decreases sharply. The approximate voltage wave form appearing at this junction is indicated on the drawing. It should be noted that capacitor 21, in addition to its previously mentioned function in the integrating network, also couples the synchronizing pulses to the junction of the diodes.

Referring for a moment to FIG. 1, it will be recalled that horizontal oscillator 12 is of the free-running type and has a natural frequency substantially equal to the frequency of recurrence of the synchronizing pulses in the received composite television signal. As is well known in the art, the horizontal oscillator 12 drives the horizontal output circuit 13 which in turn feeds high voltage transformer 14. This transformer develops high voltage pulses of short duration at the horizontal oscillator frequency. Returning now to FIG. 2, winding 35 on high voltage transformer 14 has a voltage induced in it by these high voltage pulses, substantially as indicated on the drawing. This voltage is impressed upon the integrating network comprising resistor 32, resistor 30 and capacitor 29, which produces at the junction of resistor 30 and capacitor 29, a sawtooth voltage having the general waveform indicated. Simultaneously, the action of the other integrating network, comprising resistor 31 and capacitor 21 produces at the junction of the two diodes a sawtooth voltage of smaller peak to peak amplitude. This smaller sawtooth voltage is directly combined with the synchronizing pulses from the synchronizing separator tube. An approximation of this waveform is also indicated on the drawing. The circuit constants are chosen such that the peak to peak amplitude of the sawtooth voltage appearing at the bottom terminal of diode 25 is approximately twice the peak to peak amplitude of the sawtooth voltage appearing at the common junction between diodes 24 and 25. Both diodes therefore see sawtooth voltages of substantially equal magnitude. Diode 25 has impressed upon its lower terminal a sawtooth voltage having approximately twice the peak to peak amplitude of the sawtooth voltage impressed upon its upper terminal. Hence, the net voltage impressed across diode 25 is equal to the instantaneous difference between the two sawtooth voltages. Diode 24 has the smaller sawtooth voltage impressed upon its lower terminal and none on its upper terminal.

In practice, the synchronizing pulse amplitude is greater than one half the peak to peak amplitude of the sawtooth voltage at the diode junction. Also, as shown, the pulse is negatively oriented and is impressed upon the cathode terminals of both diodes. In the absence of synchronizing pulses, the diodes sequentially conduct over different portions of the sawtooth voltage. (Diode 25 conducts during the positive portion of the sawtooth and diode 24 during the negative portion of the sawtooth.) As mentioned previously, each diode sees substantially similar sawtooth voltages, and hence zero correction voltage is obtained.

However, in the presence of an out of phase synchronizing pulse, the conductive balance is upset in accordance with the exact deviation of the synchronizing pulse with respect to the center of the retrace portion of the sawtooth voltage. When the synchronizing pulse appears midway on the retrace portion of the sawtooth voltage (at the zero line) conduction is increased equally in both diodes and the net output voltage remains zero, indicating that the horizontal oscillator 12 is running in synchronism with the received synchronizing pulses. If the synchronizing pulse occurs at the lower end of the retrace portion of the sawtooth voltage, upper diode 24 conducts more heavily than lower diode 25 and a net negative output voltage is obtained. Similarly, if the synchronizing pulse appears near the top of the retrace portion of the sawtooth voltage, conduction in lower diode 25 is increased and a net positive output voltage results.

Experience to date with this circuit has shown that with the improvements a wide variety of semiconductor diodes may be employed without the necessity of adjusting resistors 22 and 23 to compensate for diode characteristics. It should be noted particularly that the circuit of the invention stabilizes the junction point between the two diodes because of the introduction of the proper magnitude sawtooth signal at this point. Of course, not just any combination of resistance and capacitance will produce satisfactory results. The values of the integrating network resistors and capacitors must be chosen such to yield approximately a 2:1 peak to peak amplitude ratio between the lower sawtooth voltage and the upper sawtooth voltage.

The following is a table of representative values for a circuit embodying the invention.

| | |
|---|---|
| Resistors **22** and **23** | 680,000 ohms. |
| Resistor **27** | 1 megohm. |
| Resistor **30** | 120,000 ohms. |
| Resistor **31** | 2.2 megohms. |
| Resistor **32** | 100,000 ohms. |
| Resistor **34** | 100,000 ohms. |
| Capacitor **21** | 100 micromicrofarads. |
| Capacitor **26** | .001 microfarad. |
| Capacitor **28** | .01 microfarad. |
| Capacitor **29** | .001 microfarad. |
| Capacitor **33** | .047 microfarad. |
| Diodes **24** and **25** | Small selenium type. |

What has been described is a very simple, economical single ended AFC circuit which maintains symmetry and linearity over a wide range of diode characteristics. It will be understood that the values assigned to the various components are not to be considered as limitations of the invention. The invention is only to be limited by the subjoined claims.

What is claimed is:

1. An automatic frequency control circuit for use in a television receiver including means for separating recurrent synchronizing pulses from a received composite television signal and generating means for generating a horizontal sweep frequency voltage having a frequency near the frequency of recurrence of said synchronizing pulses, said automatic frequency control circuit comprising, a pair of diodes each having two terminals of opposite polarity, a connection being provided between one set of like polarity terminals of said pair of diodes, means for developing and impressing upon the remaining terminal of one of said diodes a first amplitude voltage of substantially sawtooth waveform, means for developing and impressing upon said connection between said diodes a second amplitude voltage of substantially sawtooth waveform, both said voltages having a frequency and phase equal to those of said horizontal sweep frequency voltage and said first amplitude being substantially twice said second amplitude, an output circuit interposed between said generating means and the remaining terminal of the other of said diodes, and means for impressing said synchronizing pulses upon said connection.

2. In combination in a television receiver having a synchronizing signal separator for separating synchronizing pulses from a received composite television signal and horizontal sweep frequency and high voltage generating means including an oscillator, means for maintaining said oscillator in synchronism with said synchronizing pulses comprising; a pair of diodes each having two terminals of opposite polarity, said diodes being joined between one set of terminals of like polarity; means for introducing said separated synchronizing signals to the junction of said diodes; means including an integrating network coupling the output of said generating means to the other terminal of one of said diodes for producing a sawtooth voltage of a first amplitude thereat; circuit means coupling the other terminal of the other of said diodes to said oscillator for controlling the phase and frequency thereof; and means including a resistor connected between the output of said generating means and the junction of said diodes for producing a sawtooth voltage of a second amplitude thereat, said first amplitude being substantially twice said second amplitude.

3. An automatic frequency control circuit for a television receiver including a synchronizing signal separator for separating synchronizing pulses from a received composite television signal, a horizontal oscillator, and means for generating high voltage pulses in accordance with said horizontal oscillator output, said automatic frequency control circuit comprising; a pair of diodes each having two opposite polarity terminals, said diodes being connected at one set of like polarity terminals; circuit means coupling said high voltage pulses to the other terminal of one of said diodes for producing a first amplitude sawtooth waveform thereat; means coupling the other terminal of the other of said diodes to said horizontal oscillator for effecting control of the phase and frequency thereof in accordance with the magnitude and polarity of the potential appearing at said last mentioned terminal; means coupling said separated synchronizing pulses to the connection between said diodes; and means including impedance means coupling said high voltage pulses to said connection for developing thereat a similar sawtooth waveform of a second amplitude, the ratio of said first amplitude to said second amplitude being substantially two.

4. In combination in a television receiver including a synchronizing signal separator for separating synchronizing pulses from a received composite television signal, a horizontal oscillator, means for developing a pulse voltage in accordance with said oscillator output and an automatic frequency control circuit for maintaining the phase and frequency of said oscillator in synchronism with said separated synchronizing pulses, said automatic frequency control circuit comprising; a first and a second diode each having two terminals of opposite polarity, said diodes being connected together at one set of like polarity terminals; a first integrating network coupled to the other terminal of said first diode; means for applying said pulse voltage to said first integrating network whereby a first substantially sawtooth voltage having a peak to peak amplitude equal to "A" is impressed upon said other terminal of said first diode; circuit means interconnecting the other terminal of said second diode with said oscillator; a second integrating network interposed between the connection between said diodes and said pulse voltage means whereby a second substantially sawtooth voltage having a peak to peak amplitude substantially equal to $A/2$ is impressed upon said connection; said second integrating network including a capacitor for coupling said synchronizing pulses from said synchronizing signal separator to said connection between said diodes.

5. In combination in a television receiver including a synchronizing signal separator for separating synchronizing pulses from a received composite television signal, a horizontal oscillator, means for developing a pulse voltage in accordance with said oscillator output and an automatic frequency control circuit for maintaining the frequency and phase of said oscillator in synchronism with said separated synchronizing pulses, said automatic frequency control circuit comprising; a first and a second diode each having two terminals of opposite polarity, said diodes being connected together at one set of like polarity terminals; a first integrating network coupled to the other terminal of said first diode; means for applying said pulse voltage to said first integrating network whereby a first substantially sawtooth waveform voltage having a peak to peak amplitude equal to "A" is impressed upon said other terminal of said first diode; circuit means interconnecting the other terminal of said second diode with said oscillator; a second integrating network interposed between the connection between said diodes and said pulse voltage means whereby a second substantially sawtooth waveform voltage having a peak to peak amplitude substantially equal to $A/2$ is impressed upon said connection, said second integrating network including a capacitor for coupling said synchronizing pulses from said synchronizing signal separator to said connection between said diodes and a resistor connected between said pulse voltage means and said connection between said diodes.

6. In combination in a television receiver including a synchronizing signal separator for separating synchronizing pulses from a received composite television signal, a horizontal oscillator, means for developing a pulse voltage in accordance with said oscillator output and an automatic frequency control circuit for maintaining the frequency and phase of said oscillator in synchronism with said separated synchronizing pulses, said automatic frequency control circuit comprising; a first and second semiconductor diode each having two terminals of opposite polarity, said diodes being connected together at one set of like polarity terminals; a pair of load resistors individually connected across respective ones of said diodes; a first integrating network coupled to the other terminal of first diode; means for applying said pulse voltage to said first integrating network whereby a first substantially sawtooth waveform voltage having a peak to peak amplitude equal to "A" is impressed upon said other terminal of said first diode; circuit means interconnecting the other terminal of said second diode with said oscillator; a second integrating network interposed between the connection between said diodes and said pulse voltage means whereby a second substantially sawtooth waveform voltage having a peak to peak amplitude substantially equal to $A/2$ is impressed upon said connection, said second integrating network including a capacitor for coupling said synchronizing pulses from said synchronizing signal separator to said connection between said diodes and a resistor connected between said pulse voltage means and said connection between said diodes.

References Cited in the file of this patent

UNITED STATES PATENTS 2,906,818 Goodrich -------------- Sept. 29, 1959